Figure 1:
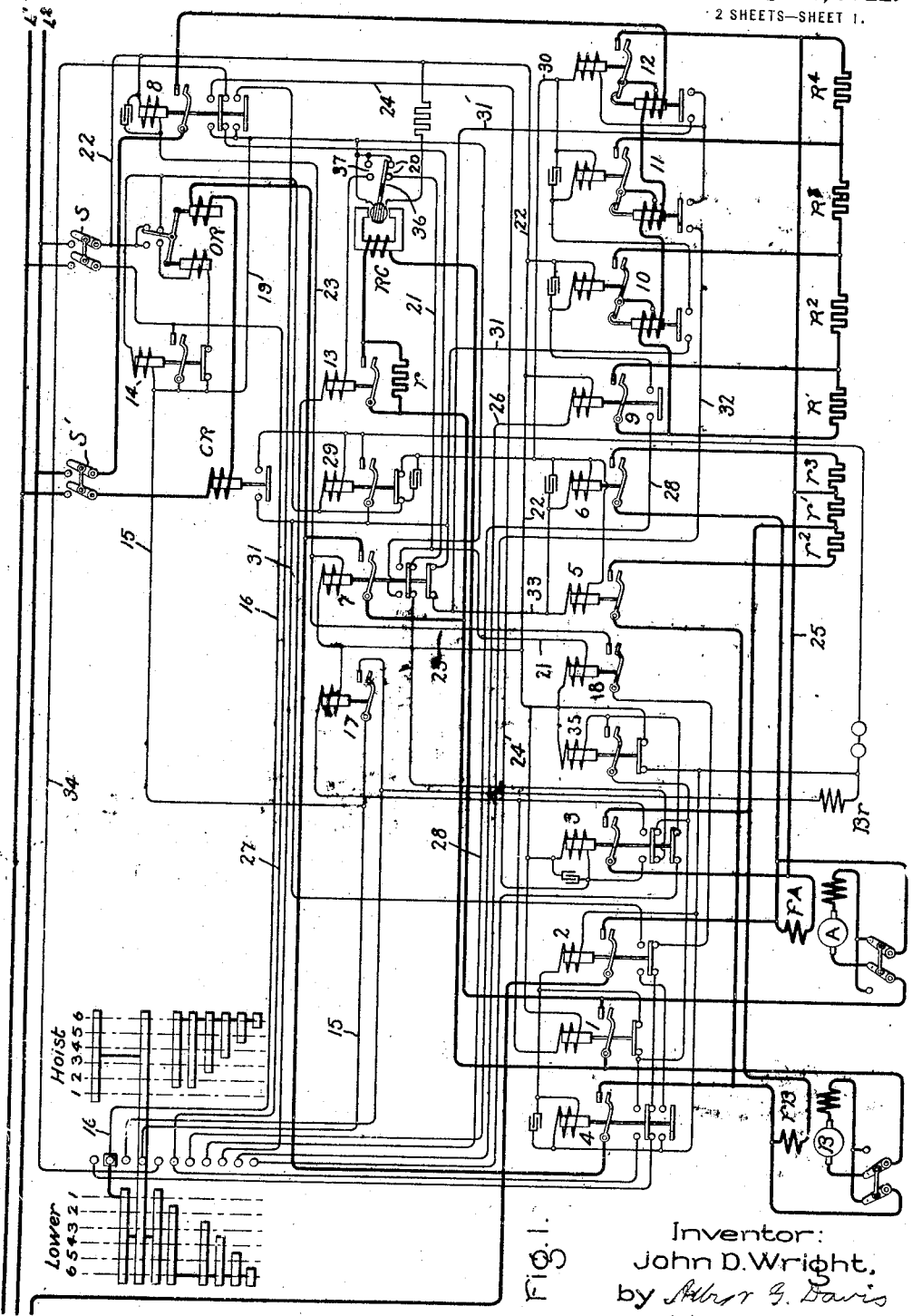

Inventor:
John D. Wright,
by Albert G. Davis
His Attorney.

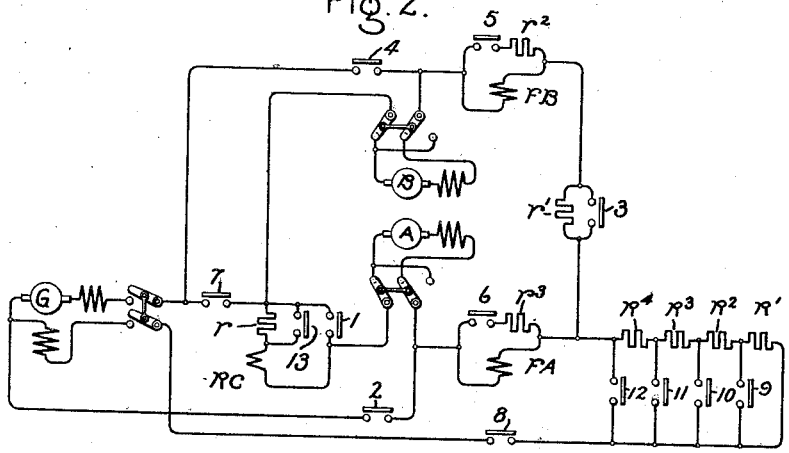

UNITED STATES PATENT OFFICE.

JOHN D. WRIGHT, OF SCHENECTADY, NEW YORK, ASSIGNOR TO GENERAL ELECTRIC COMPANY, A CORPORATION OF NEW YORK.

MOTOR CONTROL.

1,426,939. Specification of Letters Patent. Patented Aug. 22, 1922.

Application filed January 2, 1919. Serial No. 269,380.

*To all whom it may concern:*

Be it known that I, JOHN D. WRIGHT, a citizen of the United States, residing at Schenectady, in the county of Schenectady, State of New York, have invented certain new and useful Improvements in Motor Controls, of which the following is a specification.

My invention relates to the control of electric motors and has for its object the provision of improved means whereby a plurality of motors may be stopped, started and generally controlled in a simple, reliable and efficient manner.

My invention relates more specifically to the control of electric motors for operating hoists or the like where the speed of lowering may be greatly in excess of the hoisting speed. One of the objects of my invention is to provide a control system for such motors in which there is regenerative braking during the lowering of the load, thereby saving power and furnishing a very effective and easily controlled brake for the load. Other objects and purposes of my invention will appear in the course of the following specification in which I have disclosed my invention embodied in concrete form for purposes of illustration.

In the accompanying drawings illustrating one embodiment of my invention Fig. 1 is a diagrammatic view of my improved system; Fig. 2 is a simplified diagram showing the main motor circuits; and Fig. 3 is a key to indicate the operation of the contactors.

In describing my invention I shall first explain the general features in connection with Fig. 2 and then describe the detailed operation in connection with Fig. 1. Referring, therefore, to Fig. 2 it will be seen that I have illustrated my invention in connection with two electric motors, the armatures of which are designated A and B, which are supplied by a generator G. FB represents the series field for the armature B and FA represents a series field for the armature A. In the hoisting system which I have illustrated these series wound dynamo electric machines are operated as motors in parallel during hoisting and in series during lowering, the arrangement being such, however, that during lowering the fields are initially excited independently of the armatures so as to produce an effective regenerative braking action, but after regeneration begins the motors are self-excited. $R'$, $R^2$, $R^3$ and $R^4$ are starting resistances which are cut out of circuit by contactors 9, 10, 11 and 12 respectively. RC represents a winding of a reverse current relay which is shown more in detail in Fig. 1. The function of this relay is to effect the closing of contactor 13 when the current, which is passed through this winding, is reversed. This will occur on the lowering of the load when the motors are overhauled by the load at a speed which causes the electromotive force generated thereby to exceed the electromotive force of the generator. When this occurs, contactor 13 will close and short circuit a section of resistance $r$ which will permit the motors to excite their own fields and the excess current to be returned to the line.

It will be noted that the armatures and the fields of these motors are at all times in a closed loop and that the reversal is brought about by reversing the current through the field of one motor and the armature of the other. By referring to the key of Fig. 2, it will be seen that in the first hoisting position contactors marked 1, 3, 7 and 8 are closed. The closing of these contactors completes the circuit through the motors in parallel, the circuit being as follows: from the positive side of the generator through the contactor 7, through the armature B and its commutating field, through the series field FB of armature B, through contactor 3, through resistances, $R^4$, $R^3$, $R^2$ and $R'$ and thence through contactor 8 to the opposite side of the generator. A circuit is also established through contactor 7, contactor 1, through armature A and its commutating field, through series field FA of armature A and back to the generator, through resistances $R^4$, $R^3$, $R^2$ and $R'$ and contactor 8. The motor armatures are thus in parallel branches of a circuit from the generator. In the 2nd, 3rd, 4th and 5th hoisting positions the contactors 9, 10, 11 and 12 close successively to cut out the associated resistance sections and the motors are finally brought up to speed in parallel circuits. It will be noted that in hoisting, the contactor 1 is closed, thereby short circuiting the winding RC of the reverse current relay and the resistance $r$. During the hoisting, therefore, the reverse current relay is not in action.

Referring again to the key, it will be seen that on lowering, the contactors 2 and 4 are closed in the first position. The closing of these two contactors accomplishes three principal changes; first, it places the armatures in series; second, it causes the fields to be energized independently of the armatures; and third, it causes the motors to be reversed by reversing the current through the field of one motor and the armature of the other. Furthermore, contactor 1 being open, the current through the armatures passes through the winding of the reverse current relay RC. The circuit will now be as follows: from the positive side of the generator, through contactor 4, through the armature B and its commutating field, through the resistance $r$, winding RC of the reverse current relay, through the armature A and its commutating field, through contactor 2 and back to the generator. There is also a circuit established through the motor fields from the contactor 4, through series fields FB, through resistance $r'$, series field FA and contactor 2 back to line. It will be noted that the armatures and fields are again in a closed loop but the direction of current is now reversed through the armature B and the field FA, thereby reversing the direction of rotation of the motors. The motors are now operated in series with the fields connected in shunt and a resistance $r$ in series with the armatures. This connection will be maintained when the controller is moved to positions 2 and 3. In position 4, contactors 5 and 6 are closed, thereby connecting resistances $r^2$ and $r^3$ in parallel with the fields of the motors so as to weaken the fields and speed up the motors.

The object of connecting the fields in shunt to the armatures is to provide a constant field for regenerative braking purposes. My system is particularly adapted for use in connection with hoisting apparatus such as shovels and dredges in which the load may be rapidly lowered. My arrangement provides for such rapid lowering through the overhauling of the motors by the load. When, therefore, the load starts to lower, the counter electromotive force of the motor increases, and when it rises above the electromotive force of the generator, the current through the armatures and through the winding of the reverse current relay will be reversed, thereby closing the contactor 13 and short circuiting the resistance $r$. From this point on current will be supplied to the motor fields and the excess returned to the line through the regenerative braking action. This in general is the operation of my system.

Referring now to Fig. 1, it will be seen that I have illustrated the complete system of connections which will bring about this general result. When the switches S and S' are closed, the low voltage release contactor 14 is closed from line L—2, through the contacts of the overload relay OR, through the winding of the contactor 14, through wire 15 to the controller, wire 16 and back to line L—1. The closing of contactor 14 energizes the winding of contactor 18 from line L—1, through contactor 14, wire 19, contacts 20 of the reverse current relay, wire 21, winding of contactor 18, and thence back to line through wire 22. If now the controller is moved to the first hoisting position, the contactors 7 and 8 will be energized by the closing of contactor 18, the circuit being as follows: from line L—2, through the winding of contactor 8, wire 23, contacts of contactor 18, and thence through the interlocks on contactors 2 and 4 to the controller and back to line through feed wire 15. Contactor 7 is also energized from line L—2 through wire 22, contactor 18, interlocks on contactors 2 and 4 and back to line through the controller. The closing of contactor 8 energizes contactor 3 through wire 22 and windings of contactor 3, wire 24, interlock of contactor 8 and back to line through wire 19 contactor 14 to L—1, and the closing of contactor 3 energizes contactor 1, through wire 22, interlock on contactor 3, wire 24 interlock on contactor 8, wire 19, back to line L—1 through the contacts of 14. Contactors 1, 3, 7 and 8 now being closed, a circuit through the motors is established in parallel as follows: from line L—1 through a current relay CR, through the winding on the overload relay OR, through contactor 7, through the armature B, field winding FB of armature B, contactor 3, wire 25, through the resistances $R^4$, $R^3$, $R^2$, and $R'$, through the series relays on contactors 10, 11 and 12 respectively, through contactor 8 and back to line L—2. A circuit is also established through the armature A from contactor 7, through contactor 1, thence through armature A, field FA, wire 25 and back to line through resistances $R^4$, $R^3$, $R^2$, and $R'$ as before. In this position contactor 17 is also energized from wire 22 through an interlock on contactor 3, wire 24, interlock on contactor 8 and wire 19. This energizes brake coil BR and releases the brake. The motors are now operating in parallel with the resistance in series. When the master controller is moved to position 2, the winding of contactor 9 will be energized through wires 22 and 26 which run to the master controller and thence back to line through wires 27 and 19 thereby cutting out section of resistance R'. In the third position the winding of contactor 10 will be energized from wire 22 through an interlock on contactor 9 and the wire 28 which runs to the master controller. When the controller is moved to the fourth position the contactor 11 will be energized from line L—2 through the contacts of overload relay OR through the interlock on contactor 29, wire 30, current limit interlock on contactor 10 and wire 31 which runs to the master controller. In the fifth position the winding of contactor 12 will be energized in a similar manner from wire 30 thence through the current limit interlock on contactor 11 and wire 32 which runs to the master controller. Contactors 5 and 6 close automatically in this position when the current limit relay on contactor 12 closes, the circuit being from L—2 through the interlocks on contactor 29, through the windings of contactors 5 and 6 in parallel, wires 33 and 31' and contacts on relays 12 and 11 to the controller. The closing of contactors 5 and 6 connects resistances $R^2$ and $R^3$ respectively in parallel with the field windings FB and FA, thereby increasing the speed of the motors. The motors are now running at full speed in a hoisting direction.

When the master controller is thrown to the reverse position all the contactors open in passing through the off position and when the reverse position is reached the contactors 2 and 4 will be closed, the circuit being from line L—1 and wire 15 to the controller, thence to wire 34, interlock on contactor 8, interlock on contactor 7, interlock on contactor 3, interlock on contactor 1, thence through the windings of contactors 2 and 4 in parallel and interlock on contactor 35 back to line at L—2 on wire 22. Brake coil BR is also energized independently of contactor 17 through an interlock on contactor 35. The closing of contactors 2 and 4 connects the motor armatures in series, the circuit being from L—1, through contactor 4, through armature B, resistance $r$, through the winding RC of the reverse current relay, through armature A, and contactor 2, back to line. The field windings are now connected from contactor 4, through field winding FB, through resistance $r'$, field winding FA and contactor 2 back to line. The direction of rotation of the two motors is, therefore, reversed, the current being reversed through the armature A and the field FB. It will be noted that the armature current now passes through the winding RC of the reverse current relay. This relay is a standard device consisting of an armature which is energized across the line so as to move a contact finger 36 into engagement with contact 20 when the winding RC is not energized or is energized by current in one direction, which in this case is the direction of the current when the motors are operating as such in lowering. When, however, the current in the winding is reversed, the contact finger 36 moves into engagement with contact 37, thereby energizing the winding of contactor 13 and causing the latter to operate and short circuit the resistance $r$. During the initial lowering operation, therefore, the reverse current relay will remain in the position shown in the drawing. No change is made in the connections in moving to the second or third positions, but in the 4th position the contactors 5 and 6 close and weaken the fields of the motors and cause the motors to speed up. The motors are now having a shunt excitation and when the load overhauls the motors, the latter will act as generators and when the counter electromotive force rises above the electromotive force of the generator, the direction of current will reverse, thereby causing the reverse current relay to operate and actuate the contactor 13 to short circuit the resistance $r$. This may happen on any of the first five positions. The motors will now regenerate, returning current to the line and at the same time acting as an effective brake upon the motors. In the 6th position contactor 35 is energized through an interlock on contactor 3. The closing of this contactor energizes a magnet valve on the hoist drum clutch (not shown). Contactors 2, 4, 5 and 6 are opened at the interlock on contactor 35, and the brake magnet BR is similarly deenergized so as to apply the brake and stop the motor. When the controller is returned to the "off" position the contactor 35 opens.

The purpose of the current relay CR is to act as a jamb relay. In case the hoisting apparatus gets jambed or stalled and the current should rise above a safe value, the relay CR will operate and energize the contactor 29, the main contacts of which are in parallel with those of the current limit relay. The interlock on the contactor 29, however, causes the opening of contactors 5, 6, 11 and 12 which protect the motors. In order to close the contactors again the controller must be turned to the 3rd position which will deenergize contactor 29 permitting contactors 11 and 12 to reclose when the controller is moved forward.

What I claim as new and desire to secure by Letters Patent of the United States, is:

1. The combination with a hoist or the like, of a pair of reversible series wound driving motors therefor having their fields and armatures connected in a closed loop during operation in either direction, of means for connecting the field of each machine in series with its armature for hoisting and for connecting the fields independently of the armatures during lowering, and means for simultaneously reversing the current in the field of one of said motors and in the armature of the other to reverse the direction of rotation of the motors.

2. The combination with a hoist or the like, of a pair of reversible series driving motors connected in a closed loop during operation in both directions and a reversing controller for connecting the fields to the supply circuit independently of the armatures during lowering.

3. The combination with a hoist or the like, of a pair of series driving motors, a reversing controller and means whereby the motor armatures are connected in parallel branches of a circuit during hoisting and in series, with the fields energized independently of the armatures, during lowering.

4. The combination with a hoist or the like, of a pair of reversible series driving motors connected in a closed loop during operation in both directions, and means whereby the motor armatures are connected in parallel branches of a circuit during hoisting and in series, with the fields energized independently of the armatures, during lowering.

5. The combination with a pair of reversible series driving motors connected in a closed loop for operation in both directions, of a reversing controller therefor, and means whereby the motors are connected in parallel for operation in one direction and the motor armatures are connected in series relation with the fields energized independently of the armatures during operation in the other direction.

6. The combination with a pair of reversible series driving motors connected in a closed loop for operation in both directions, of a reversing controller therefor, and means whereby the motors are connected in parallel for operation in one direction and the motor armatures are connected in series relation in one branch of a multiple circuit with the fields connected in series relation in another branch of the said multiple circuit.

7. The combination with a hoist or the like, of a pair of reversible series driving motors connected in a closed loop during operation in both directions, means whereby the motor armatures are connected in parallel branches of a circuit during hoisting and in series, with the fields energized independently of the armatures, during lowering and means for reversing the field of one motor and the armature of the other to reverse the direction of operation of said motors.

8. The combination with a hoist or the like, of a pair of series wound dynamo electric driving machines, a reversing controller having means for connecting the armatures of said machines in series and the fields in series in a shunt circuit to the armatures, and means whereby upon the overhauling of the machines by the load during lowering the fields are energized from the armatures of said machines and power is returned to the supply circuit.

9. The combination with a hoist or the like, of a pair of series driving motors, a reversing controller, means whereby the motor armatures are connected in parallel branches of a circuit in one position of the controller for hoisting and in series with the fields energized independently of the armatures in the opposite direction of the controller for lowering, a resistance and a reverse current relay in the series connection for controlling the resistance.

In witness whereof, I have hereunto set my hand this 28th day of December, 1918.

JOHN D. WRIGHT.